United States Patent [19]

Yasuda et al.

[11] Patent Number: 4,723,235

[45] Date of Patent: Feb. 2, 1988

[54] SYSTEM FOR PLAYING BACK INFORMATION RECORDED ON A DISK RECORDING MEDIUM WITH AN IMPROVED DISCRIMINATION AND PLAYBACK START OPERATION

[75] Inventors: Shigeru Yasuda; Tetsuo Akiyama, both of Tokorozawa, Japan

[73] Assignee: Pioneer Electronic Corporation, Tokyo, Japan

[21] Appl. No.: 620,395

[22] Filed: Jun. 13, 1984

[30] Foreign Application Priority Data

Dec. 14, 1983 [JP] Japan .......................... 58-193157[U]

[51] Int. Cl.⁴ .......................... G11B 7/00; G11B 27/10
[52] U.S. Cl. ........................................ 369/50; 369/32; 369/44
[58] Field of Search ................ 358/342, 907; 369/30, 369/32, 33, 41, 44, 59, 111, 43, 50; 360/78

[56] References Cited

U.S. PATENT DOCUMENTS

| | | | |
|---|---|---|---|
| 4,106,058 | 8/1978 | Romeas et al. | 369/111 |
| 4,142,209 | 2/1979 | Hedlund et al. | 369/44 |
| 4,236,232 | 11/1980 | Jansen et al. | 369/44 |
| 4,330,880 | 5/1982 | Van Dijk | 369/32 |
| 4,428,074 | 1/1984 | Abe et al. | 369/32 |
| 4,437,180 | 3/1984 | Takeuchi | 369/33 |
| 4,519,056 | 5/1985 | Kimoto et al. | 369/44 |
| 4,519,057 | 5/1985 | Higashihara et al. | 369/50 |

OTHER PUBLICATIONS

Pioneer Electronic Corporation, "Laser Disc Player VP-1000 Service Manual", May 1980, pp. 1, 3, 24, 26, 37, 33 (Rewrite of Description on p. 33), 92, 116, 108, and 104.

Primary Examiner—Donald McElheny, Jr.
Attorney, Agent, or Firm—Schwartz, Jeffery, Schwaab, Mack, Blumenthal & Evans

[57] ABSTRACT

A system for playing back information recorded on a recording medium on which a lead-in code and a lead-out code are respectively recorded at the beginning and the end of a program area, comprises a first control means for rapidly moving a pickup device at least across the area of the lead-in code of the recording medium, a second control means for moving back the pickup means when the lead-out code is detected during the movement of the pickup device by the first control means, and means for discriminating the type of recording when the pickup device reaches the program area during the operation of the first and second control means. By this provision, a queuing time before the playback of the recorded program is shortened without a fear of omitting the program area.

3 Claims, 3 Drawing Figures

SYSTEM FOR PLAYING BACK INFORMATION RECORDED ON A DISK RECORDING MEDIUM WITH AN IMPROVED DISCRIMINATION AND PLAYBACK START OPERATION

BACKGROUND OF THE INVENTION

1. Field of the Invention

The present invention relates to a playback system for recorded information, and more specifically to a system for playing back information recorded on a recording medium such as a video disc, which has recording areas respectively for a lead-in code and for a lead-out code, at the beginning and the end of a recording area for program signals.

2. Description of Background Information

Video discs may generally be classified into two groups, that is, the CAV (Constant Angular Velocity) disc and the discs recorded by other of recording methods. The discs of the latter category include CLV (Constant Linear Velocity) discs on which the signal is recorded while the disc is rotated so that the linear velocity of the recording track is constant, and CAA (Constant Angular Acceralation) discs on which the signal is recorded while the disc is rotated at a constant angular acceleration, which is described in the Japanese Patent Application No. 56-196633.

The CAV discs differ from the other types of discs (the case of the CLV discs is exemplarily explained hereinafter) in the density of the information, especially the information recorded in the peripheral tracks of the disc, in the speed of rotation of the disc, and in the capability of a still picture mode which is performed by a jump scanning process. Therefore, it is necessary to detect the recording type of the disc, to execute an appropriate playback process.

A video disc has an area for a program, and lead-in code area and lead-out code area which are respectively provided in the head portion and the end portion of the program area. The program area is for a program to be recorded, and takes the form of a continuous single area. In the case of the CAV discs, a Philips code which starts from a number "1" at the beginning of this area and increases by one, and is designated as a "frame number" is recorded by insertion in the program area. Further, in the case of the CLV discs, a Philips code indicative of the CLV disc, and designated as a "CLV code" is recorded in addition to the frame number. The frame number, a time code, or the CLV code is utilized for the discrimination between the CAV recording system and the CLV recording system, that is, the discrimination between the type of recording of the disc.

The lead-in code area indicates the beginning portion of the program area, and tracks having a width over 1.5 millimeters along the radial direction of the disc before the program area are used for this lead-in code, and filled with the Philips code to be used as the lead-in code.

However, in the areas for the lead-in code and the lead-out code, the frame numbers and the time code to be used for the discrimination of the above explained recording types, are not inserted.

Generally, playback systems for video discs are designed in such a manner that the recording types can be detected only in the program area, and the searching of the information and the playback of still pictures can be started only after completion of the detection of the recording type.

In addition, the lead-out area is to indicate the termination of the program area and in which a Philips code designated as the read-out code is recorded for at least six hundred tracks after the end of the program area.

The drawback of the conventional technique is as follows. In the playback system of this type of recording disc, the position on the recording disc, from which the tracking of the pickup device is started, is adjusted by means of a tracking arrangement including a limit switch.

Therefore, due to the deviation of the position or the operation of the limit switch, there have been cases in which the playback of the lead-in portion before the playback of the program area is relatively long, more than ten seconds for instance. Since the discrimination of the type of disc is not possible in the lead-in portion, such a long period of playback of the lead-in portion before the playback of the program area is wasteful. Especially, if the playback of a special address of the program area or a portion of the program area after a predetermined length of time is required, the period before the start of the search of information may become intolerable.

If, on the other hand, the limit switch is adjusted so that the initial position of the slider is close to the program area, for avoiding the above problem, there will be a fear that the program area, if it is very short, is omitted.

Further, in the case of the CAV disc in which a picture stop code (code for the playback of still picture), is inserted, the still picture is reproduced in a manner that an information scanning position on the recording disc is repeatedly jumped to the inner side of tracks, one by one, after the detection of the picture stop code. For enabling the still picture playback mode, the playback system must have previously detected the type of the disc loaded, i.e., the CAV disc should have been discriminated. However, if the picture stop code is recorded directly after the beginning of the program area, in the first track for example, the system cannot discriminate the CAV disc in the event that the frame number is not detected correctly by means of the playback system. As the result, the playback of the still picture according to the picture stop code is neglected. This kind of malfunction may occur due to a temporal drop of information, and the playback system may become out of control if the disc playback system is operated in accordance with "software" which is produced on the premise that the picture stop operation will be performed properly.

SUMMARY OF THE INVENTION

An object of the present invention is therefore to eliminate the above problem of the conventional system, and to provide a playback system for playing back recorded information in which the playback of the program area is started in a short period of time, and without fail.

According to the present invention, the playback system of an information recorded on a recording medium in which a lead-in code and a lead-out code are respectively recorded at the beginning and the end of the program area, comprises a first control means for rapidly moving a pickup device in a direction perpendicular to the recording tracks in response to a playback command signal, so as to cross at least the area of the lead-in code, a second control means for moving the pickup device inversely with respect to the direction of the movement of the pickup device according to the operation of the first control means, upon detection of the lead-out code during the movement of the pickup device according to the operation of the first control means, and means for discriminating the recording type of the recording medium when the pickup device reaches the program area during the control operation of the first and second control means.

Further scope and applicability of the present invention will become aparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitaive of the present invention, and wherein.

DETAILED DESCRIPTION OF THE PREFERRED EMBODIMENT

Figure 1:
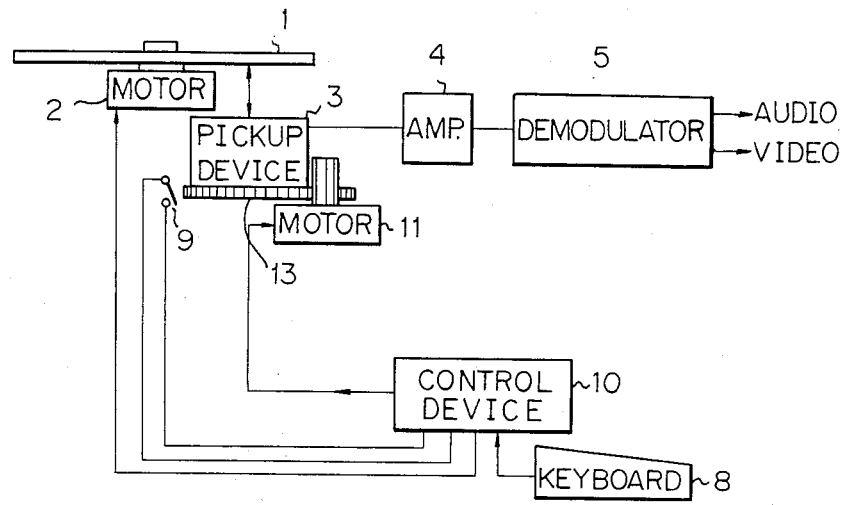
FIG. 1 is a block diagram showing an example of the construction of the conventional playback system of recorded information.

Before entering into an explanation of the present invention, reference is first made to FIG. 1 in which an example of the playback system of a video disc is illustrated. As shown, the recording medium which takes the form of a video disc 1 is mounted on a turntable driven by a spindle motor 2. The information recorded on the video disc 1 is read-out by means of a pickup device 3 whose output signal is supplied to a demodulator 5 via an amplifier 4. With this circuit arrangement, a playback video signal and a playback audio signal are derived in the demodulator 5. The manner of controlling the movement of the pickup device 3 is as follows. The pickup device 3 is mounted on a slider member 13 which is movable along a radial direction of the video disc 1, in other words, along a direction perpendicular to recording tracks of the video disc 1. The slider member 13 is driven by means of a slider motor 11 whose rotation as well as the rotation of the spindle motor 2 is controlled by means of a control device 10. Further, as shown in the figure, the playback system is provided with a keyboard 8 for inputting various commands to the player system, and a limit switch 9 disposed at an extremity of the movement of the slider member 13 and electrically connected to the control device 10.

As mentioned before, since the initial position of the pickup device 3 is determined simply by means of the limit switch 9, there have been problems, as described above; namely, deviations of the position at which the limit switch is operated and malfunctions of the movement of the pickup device 3 tend to occur.

Figure 2:
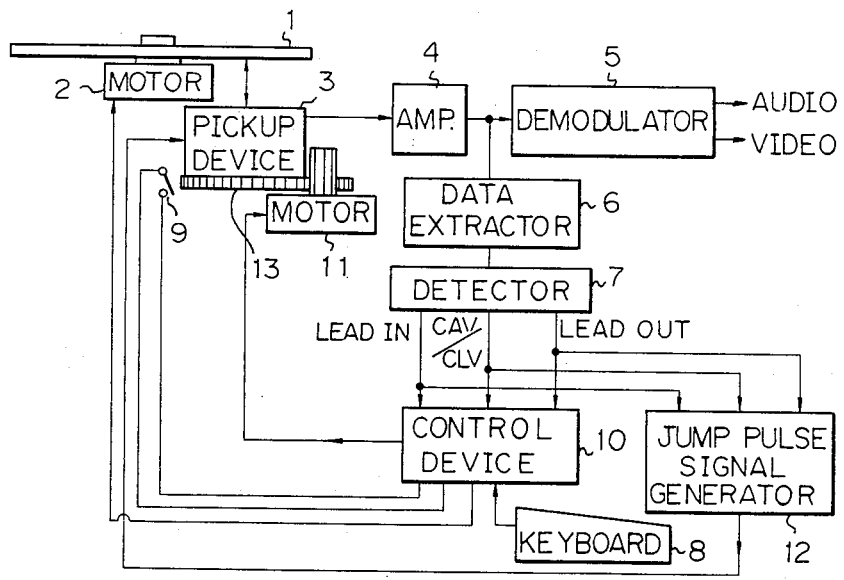
FIG. 2 is a block diagram of an embodiment of the playback system of a recorded information according to the present invention.

The embodiment of the playback system of the present invention will be described with reference to FIG. 2, in which like reference numerals used in FIG. 1 indicate like circuit parts.

In addition to the circuit parts shown in FIG. 1, the system is provided with a data extractor 6 connected to the amplifier 4, for picking up the code data from an output signal of the amplifier 4. The code data obtained in the data extractor 6 is then applied to a detector 7 in which the the type of the code data is discriminated. More specifically, whether the code signal from the data extractor 6 is the lead-in code or the lead-out code, or the frame number, or the time code, is detected in the detector 7. A detection output signal of the detector 7 is then applied to the control means 10 and also to a jump pulse signal generator 12. When the lead-out code is detected, the jump pulse signal generator 12 generates a jump pulse signal for instantly moving an information detection point at which the information is being read-out from the video disc by means of the pickup device 3, from a recording track on which the reading-out is presently taking place, to another recording track. Since the other portions of the system are identical with the system of FIG. 1, explanations thereof are omitted.

Figure 3:
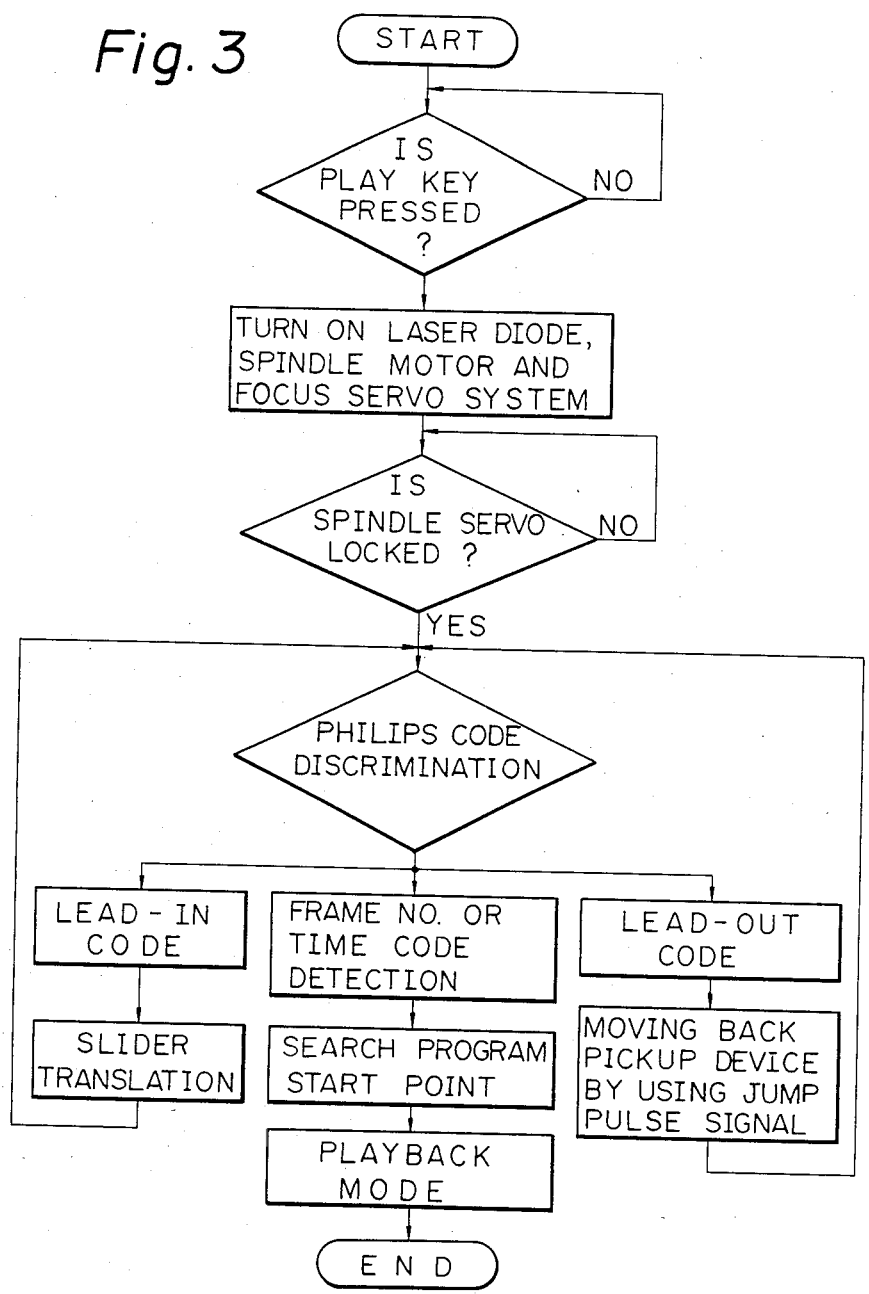
FIG. 3 is a flowchart showing the operation of the system of FIG. 2.

The operation of the playback system of FIG. 2 will now be explained with reference to the flowchart of FIG. 3. Also in this system, it is assumed that the position of the limit switch 9 is adjusted so that the tracking by the pickup device 3 is started from the lead-in position of the recording disc.

When the playback command signal is applied and the speed of the rotation of the disc 1 driven by the spindle motor 2 has reached a constant level, the pickup device 3 starts to read the information on the disc. Then the Philips code is detected by means of the data extractor 6 and the discrimination of the type of code is performed in the detector 7 in a manner as follows.

If the extracted code is the lead-in code, the control means 10 generates a fast forward command signal. By this fast forward command signal, the slider motor 13 is actuated to move the pickup device 3 in the radial direction of the video disc 1. When the pickup device 3 has reached the program area on the video disc 1 and the frame number or the time code is detected, the type of video disc, i.e., the CAV disc or the CVL disc is discriminated. Then a signal which indicates either the CAV disc or the CLV disc is generated in the detector 7 and in turn applied to the control means 10. The control means 10 controls the speed of the spindle motor 2 according to this signal so that the video disc 1 is appropriately rotated as a CAV disc or a CLV disc. At the same time, the jump pulse signal is generated at the jump pulse generator 12 to search for the start point of the program area, and the pickup device 3 is moved to the head position of the program area. Then, after discriminating the recording type of the disc, the playback of the program from the initial portion is started.

If the program area is very narrow and the pickup device 3 has skipped the program area during fast forward operation of the slider member 13, the pickup device 3 is then moved to the lead-out area and the lead-out code signal is discriminated. Therefore, a jump pulse signal is generated at the jump pulse generator 12 and the information reading position of the pickup device 3 is moved back to the program area, at the so-called normal reverse speed, by moving the information reading position of the pickup device 3 to the inner part of the video disc, by jumping, for example, two recording tracks each time.

After this operation, the discrimination between the CAV disc and the CLV disc is performed and the start point of the program area is searched. This search is performed by using the frame number in the case of the CAV disc, and using the time code in the case of the CLV disc.

Further, it is to be noted that the fast forward movement of the pickup device 3 in the lead-in area can be performed by means of the jump operation instead of the operation of the slider member 13, and the reverse transmission from the lead-out area can be performed by means of the operation of the slider member instead of the jump operation.

It will be appreciated from the foregoing, according to the present invention, the playback of the information recorded on the recording disc is rapidly initiated and positively performed because the pickup device is moved at a high speed with respect to the lead-in area and the pickup is moved back to the program area at the normal reverse speed when the lead-out area is reached. Further, the neglect of the stop code (still picture playback code) can be prevented even if it is recorded at the beginning of the program area when the system is designed to search the start point of the program area after completion of the discrimination between the CAV disc and the CLV disc.

What is claimed is:

1. An invention, comprising:
   a pickup device for reading information recorded on a recording medium having a program area on which a lead-in code and a lead-out code are recorded respectively at the beginning and the end of the program area, and carrying a record program in which an indication code from which the type of said recording medium can be determined is inserted periodically;
   data extracting means connected to said pickup means for extracting data from said information recorded on said recording medium and producing a data signal;
   code discrimination means connected to said data extracting means for identifying said lead-in code, lead-out code, and said indication code contained in said data signal;
   drive means connected to said pickup device for moving an information reading point of said pickup device across said program area of said recording medium; and
   control means connected to said code discrimination means and operating said drive means in response to the operation of said code discrimination means, said control means having a first operation mode for causing said drive means to rapidly move said information reading point of said pickup device across said program area from a start point in a first direction in response to a start command signal when said lead-in code is identified by said code discrimination means, a second operation mode for causing said drive means to move said information reading point of said pickup device across said program area in a second direction opposite to said first direction when said lead-out code is identified by said code discrimination means when said information reading point is moved in said first direction by said first operation of said control means, and a third operation mode for causing said drive means to locate said information reading point at a program start point of said program area when said indication code is identified by said code discrimination means during said first operation mode or said second operation mode of said control means.

2. An invention as set forth in claim 1, wherein said control means cause said information reading point to move in said second direction at a speed substantially equal to a normal playback speed during said second operation mode of said control means.

3. An invention as set forth in claim 1, wherein said control means generate drive signals in the form of a slider motor drive signal and a jump pulse signal for operating said drive means, and wherein said drive means comprise a slider motor mechanism on which said pickup device is mounted and driven by said slider motor drive signal generated by said control means and drive means incorporated in said pickup device and driven by said jump pulse signal generated by said control means for moving said information reading point of said pickup device.

* * * * *